(12) United States Patent
Chakradhar et al.

(10) Patent No.: US 7,203,935 B2
(45) Date of Patent: Apr. 10, 2007

(54) HARDWARE/SOFTWARE PLATFORM FOR RAPID PROTOTYPING OF CODE COMPRESSION TECHNOLOGIES

(75) Inventors: Srimat Chakradhar, Princeton, NJ (US); Jörg Henkel, Princeton, NJ (US); Venkata Jakkula, Princeton, NJ (US); Haris Lekatsas, Princeton, NJ (US); Murugan Sankaradass, Princeton, NJ (US)

(73) Assignee: NEC Corporation, Tokyo (JP)

( * ) Notice: Subject to any disclaimer, the term of this patent is extended or adjusted under 35 U.S.C. 154(b) by 423 days.

(21) Appl. No.: 10/309,824

(22) Filed: Dec. 5, 2002

(65) Prior Publication Data

US 2004/0111710 A1  Jun. 10, 2004

(51) Int. Cl.
*G06F 9/45* (2006.01)
*G06F 9/30* (2006.01)

(52) U.S. Cl. .................. 717/151; 717/152; 717/159; 712/208; 712/245

(58) Field of Classification Search ................ 717/151, 717/152, 159; 712/208, 245
See application file for complete search history.

(56) References Cited

U.S. PATENT DOCUMENTS

| | | | | |
|---|---|---|---|---|
| 5,764,994 A | * | 6/1998 | Craft ........................ | 717/159 |
| 5,819,058 A | * | 10/1998 | Miller et al. ............... | 712/210 |
| 5,905,893 A | * | 5/1999 | Worrell ..................... | 717/151 |
| 6,263,429 B1 | * | 7/2001 | Siska ........................ | 712/245 |
| 6,640,283 B2 | * | 10/2003 | Naffziger et al. ........... | 711/118 |
| 6,907,598 B2 | * | 6/2005 | Fraser ....................... | 717/127 |
| 6,952,820 B1 | * | 10/2005 | Schultz et al. ............. | 717/151 |

OTHER PUBLICATIONS

Debray et al., "Compiler Techniques for Code Compaction", 2000, ACM, p. 378-415.*
Clausen et al., "Java Bytecode Compression for Low-End Embedded Systems", 2000, ACM, p. 471-489.*
H. Lekatsas, et al.: "Design of an One-cycle Decompression Hardware for Performance Increase in Embedded Systems"; Proceedings of the 39th Design Automation Conference, United States, IEEE, Jun. 2002, p. 34-39.
H. Lekatsas, et al.: "SAMC: A Code Compression Algorithm for Embedded Processors"; IEEE Transactions on Computer-Aided Design of Integrated Circuits and Systems, United States, IEEE, Dec. 1999, vol. 18, No. 12, p. 1689-1701.

* cited by examiner

*Primary Examiner*—Wei Zhen
*Assistant Examiner*—Qamrun Nahar
(74) *Attorney, Agent, or Firm*—Sughrue Mion, PLLC (57) ABSTRACT

A method for code compression of a program, the method comprising separating code from data. Software transformations necessary to make address mappings between compressed and uncompressed space are introduced into the code. Statistics are obtained about frequency of occurrence instructions, wherein said statistics include frequency of occurrence of two consecutive instructions. The program is parsed to identify occurrence of instructions or instruction pairs. The identified instructions are replaced with an address to a compressed bus-word table. An address mapping is generated from uncompressed address to compressed addresses.

15 Claims, 9 Drawing Sheets

FIG. 1

PRIOR ART

FIG. 2

PRIOR ART

PRIOR ART

HARDWARE/SOFTWARE PLATFORM FOR RAPID PROTOTYPING OF CODE COMPRESSION TECHNOLOGIES

A. FIELD

This disclosure teaches techniques related to code compressions. Specifically, hardware and software platforms for rapid prototyping of computer code are discussed.

B. BACKGROUND

1. References

The following papers provide useful background information, for which they are incorporated herein by reference in their entirety, and are selectively referred to in the remainder of this disclosure by their accompanying reference numbers in triangular brackets (i.e., <3> for the third numbered paper by Ishiura et al.):

<1> L. Benini, A. Macii, E. Macii, and M. Poncino. Selective Instruction Compression for Memory Energy Reduction in Embedded Systems. *IEEE/ACM Proc. of International Symposium on Low Power Electronics and Design (ISLPED '99)*, pages 206–211, 1999.

<2> IBM. CodePack PowerPC Code Compression Utility User's Manual. Version 3.0, 1998.

<3> N. Ishiura and M. Yamaguchi. Instruction Code Compression for Application Specific VLIW Processors Based on Automatic Field Partitioning. *Proceedings of the Workshop on Synthesis and System Integration of Mixed Technologies*, pages 105–109, 1998.

<4> C. Lefurgy, P. Bird, I. Cheng, and T. Mudge. Code Density Using Compression Techniques. *Proceedings of the Annual International Symposium on MicroArchitecture*, pages 194–203, December 1997.

<5> C. Lefurgy and T. Mudge. Code Compression for DSP. CSE-TR-380-98, University of Michigan, November 1998.

<6> C. Lefurgy, E. Piccininni, and T. Mudge. Reducing Code Size with Run-time Decompression. *Proceedings of the International Symposium of High-Performance Computer Architecture*, January 2000.

<7> S. Y. Liao, S. Devadas, and K. Keutzer. Code Density Optimization for Embedded DSP Processors Using Data Compression Techniques.
*Proceedings of the Chapel Hill Conference on Advanced Research in VLSI*, pages 393–399, 1995.

<8> T. Okuma, H. Tomiyama, A. Inoue, E. Fajar, and H. Yasuura. Instruction Encoding Techniques for Area Minimization of Instruction ROM. *International Symposium on System Synthesis*, pages 125–130, December 1998.

<9> A. Wolfe and A. Chanin. Executing Compressed Programs on an Embedded RISC Architecture. *Proceedings of the International Symposium on Microarchitecture*, pages 81–91, December 1992.

<10> Y. Yoshida, B.-Y. Song, H. Okuhata, and T. Onoye. An Object Code Compression Approach to Embedded Processors. *Proceedings of the International Symposium on Low Power Electronics and Design (ISLPED)*, ACM: 265–268, August 1997.

2. Introduction

The advent of ever decreasing feature sizes in silicon technology following Moore's Law has ever since imposed designers with severe constraints: even though higher integration densities allow for smaller die sizes—assuming a constant amount of transistors per die—in reality, the die sizes have increased rapidly, too, driven by the demand for more complex applications requiring more processing power and memory sizes. Secondary effects resulting from this trend are significantly increased power dissipation per area, signal integrity problems etc. Diverse techniques at various levels of abstraction are deployed to cope with these problems.

Code compression is an old art that is around since the early days of micro processors. When the instruction code of a processor can be compressed significantly then the memory usage, and as such the chip area, can be reduced by a more or less noticeable amount and thus helping to solve some of the above-mentioned problems. However, code compression had a significant impact, mainly because it was focused on memory size reduction only. Taking into consideration the additional hardware necessary to achieve decompression, this overhead was in many cases not justified.

Recent research activities have investigated ways to extend the benefits of code compression technologies: rather than just aiming to minimize the memory usage through code compression, it has been investigated in how far code compression can contribute to increase the performance of a system or even minimize power consumption. The key to these extended benefits lays in techniques that are designed to place the decompression hardware as close as possible to the location where instruction code is being used, i.e. the processor. Using this approach, many system parts like buses cache hierarchies, main memory etc. can all benefit from compressed instruction code through higher bandwidths (bus, memory system).

The problem involved with applying these techniques, however, is the significantly increased complexity of the decompression hardware that has to decompress instructions on-the-fly. As discussed in this disclosure on, this involves carefully designed hardware. As benefits, a properly designed system using code compression can boost performance, reduce memory usage and decrease power consumption.

3. Related Work

In the following we will review the most related work and afterwards point out the differences and advantages of our approach.

Wolfe and Chanin developed the Compressed Code RISC Processor (CCRP), which was the first system to use cache-misses to trigger decompression <9>. Their decompression engine is designed as part of the cache refill hardware.

The instructions in each L1 cache block are Huffman encoded separately so that each block can be individually decompressed without requiring decompression of other blocks in advance. As Huffman codes are variable length codes, decoding is not as fast as with dictionary methods. Since the fixed-length cache blocks are compressed to variable-length blocks, an index table is required to map native cache-miss addresses to compressed code addresses.

This requires the decompression engine to conduct one more level of lookup to find the data. The authors report a 73% compression ratio on the MIPS architecture.

CodePack is used in IBM's embedded PowerPC systems <2>. Their scheme resembles CCRP in that it is part of the memory system. The CPU is unaware of compression, and a LAT-like device maps between the native and compressed address spaces. The decompression engine accepts L1-cache miss addresses, retrieves the corresponding compressed bytes from main memory, decompresses them, and returns native PowerPC instructions to the L1-cache.

CodePack achieves 60% compression ration on PowerPC. IBM reports that performance change in compressed code is within 10% of native programs—sometimes with speedup. A speedup is possible because CodePack implements pre-fetching behavior that the underlying processor does not have.

Software decompression is also possible, simplifying the hardware design and allowing the decompression to be selected at run-time. The hardware is simplified because the decompression software uses the arithmetic unit in the processor core, rather than having separate specialized logic structures. Lefurgy et al. <6> proposed two hardware mechanisms to support software decompression. First an L1 cache miss triggers a cache miss exception that runs the decompression program. Second, a privileged instruction used by the decompression stores decompressed instructions directly into the instruction cache. The decompression software is not compressed and resides in a region of memory that does not cause a decompression exception. Another technique that can be carried away purely in software is a dictionary method proposed by Liao et al. <7> where mini-subroutines are introduced replacing frequently appearing code fragments.

Ishiura and Yamaguchi <3> proposed a compression scheme for VLIW processors based on automated field partitioning.

They keep the size of the decompression tables small by producing codes for sub-fields of instructions. Benini et al. <1> limit the dictionary size by selectively compressing instructions. Lefurgy et al. also proposed a dictionary scheme used in their DSP compression work <5>. Okuma et al. <8> proposed an interesting encoding technique that takes into account fields within instructions. Yoshida et al. <10> proposed a logarithmic-based compression scheme which can result in power reduction as well.

C. Code Compression Basics

The following describes basic techniques and concepts that are crucial for code compression.

1. Random Access

Random access is an important concept in code compression. As opposed to compressing whole files (e.g. images) in code compression it is necessary to provide the possibility to decompress single code section out of the whole code at a certain time. In other words, it must be possible to randomly access, i.e. decompress those code sections. Random access is necessary due to the nature of software programs whose control flow is non-sequential. The possibility of decompressing the whole code at once is technically not interesting since the memory usage for decompressing the whole a code as a single stream require at least as much memory as is needed by the uncompressed program. Thus, a non-random-access code compression technique does not benefit from decreased system memory usage.

2. Granularity in Code Compression

The above-described random access characteristic requires to decompose the whole code into sections such that each section can be decompressed on its own. Because of the decompression history decompression can only start at the beginning of the boundaries of these sections. There various possibilities for these sections:

a) Basic Block

A basic block as a sequence of code that is always and completely executed from the beginning straight to the end is the most obvious granularity as an implication of the random access characteristic. A basic block typically contain many assembly instructions. In this sense a basic block has a reasonable size in order to provide a good compression ratio. The disadvantage of using a basic block is the great variance in size that can reach anything from a single assembly instruction to hundred of assembly instruction. In terms of technical implementation of a decompression mechanism this means a great variances in decompression time and causes some non-deterministic behavior as far as system execution time is concerned. Related to this problem is the absolute decompression time: assuming a reasonable hardware effort it is impossible to decompress a basic block within a system clock cycle (assuming that it is a speed-optimized system) due to the average size of a basic block. However, depending on the architecture (see also II-D) fast decompression might be required that guarantees decompression in a few or even just one clock cycle.

b) Instruction

The smallest, technically feasible, entity to apply code compression to is a single instruction. The size of a single instruction makes it possible to decompress it within a single clock cycle. Therefore, it is very beneficial for the so-called post-cache architecture (see also II-D). According to the small size, however, compression ratios are significantly reduced to basic block-based approaches. The complexity of a decompression hardware depends on the instruction format:

What the granularity of such a part is will be discussed later in this disclsoure. "Decompression history" is related to the state of the decompression mechanism.

(1) Non-fixed Instruction Sizes

A non-fixed instruction imposes various constraints on the compression scheme: in a dictionary-based compression approach symbols of varying size may waste more or less bits or, alternatively, many dictionaries, each keeping symbols of same size, represent a complex hardware scheme. When the compressed instruction stream is decompressed, instructions of various sizes are generated. It is then the task of the hardware to assemble these instructions to complete words (for example 32 bits) that can be sent to the processor. The recognition of uncompressed instruction sizes along with the word assembling is a very hardware-intensive and latency consuming task.

The example platform discussed herein, that implements the disclosed techniques, is based on Tensilica's XTensa processor that has instruction word sizes of 24-bit and 16-bit width.

(2) Fixed Instruction Sizes

Fixed instruction size do not feature the above-mentioned problems and hardware overhead.

3. Indexing

Indexing in code compression is a problem that arises through random access: indexing must provide the address of a jump target in the compressed space. That is because the code preceding the jump target is not being decompressed.

Hence, the jump target's address is unknown. Since compression ratios of certain code parts cannot be assumed to be constant, the jump target addresses cannot be computed either. Wolfe and Chanin <9> proposed using a table that maps uncompressed block positions (addresses) into compressed block positions. The main drawback of this method is that as the block size decreases, the overhead of storing the table increases. Another approach is to leave branches untouched during the compression phase and then patch the offsets to point to compressed space <4>. We use a similar approach here, only we compress branches as well.

4. Basic Architectures

Figure 1:
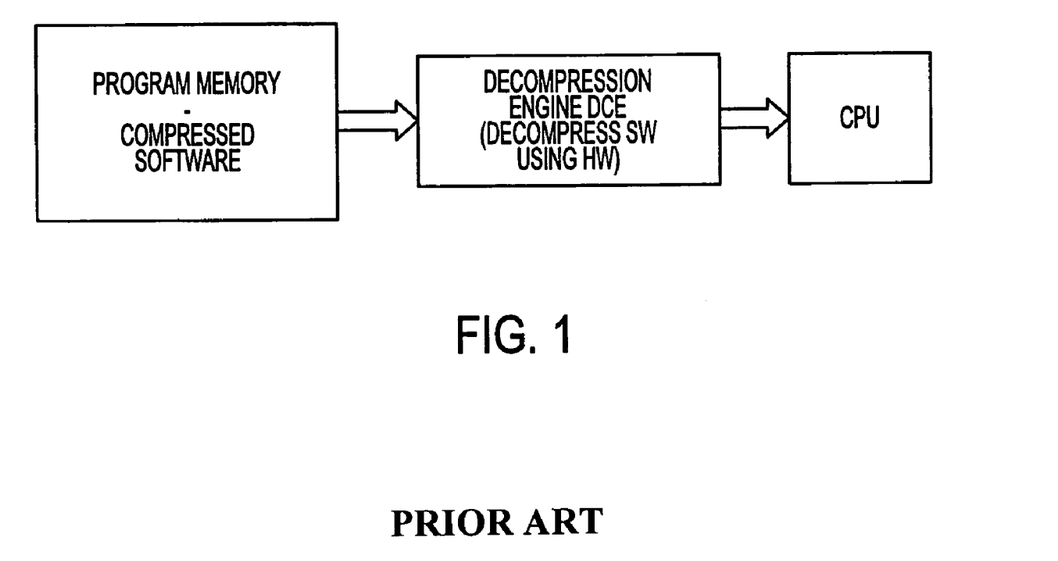
FIG. 1 shows a principle of code compression on the fly.

This section gives some basic principles of architectural issues for code decompression. FIG. 1 illustrates the basic principle used by many code decompressions techniques: the instruction code is placed in the instruction memory from were it is fetched by the decompression hardware. After the code is decompressed it is passed to the CPU.

There are different issues and alternatives:

a) Memory Hierarchy

There can be a memory hierarchy in between like L1 cache, L2 cache. Performance issues and memory size issues largely depend on where exactly the decompression unit is placed.

b) Bus System

The communication infrastructure like buses might profit from compressed code being transferred, too.

Effective bandwidths can increase. Again, the impact will largely depend on where the decompression unit is placed (see also Section II-E).

c) Post-cache and Pre-cache Architectures

Figure 2:
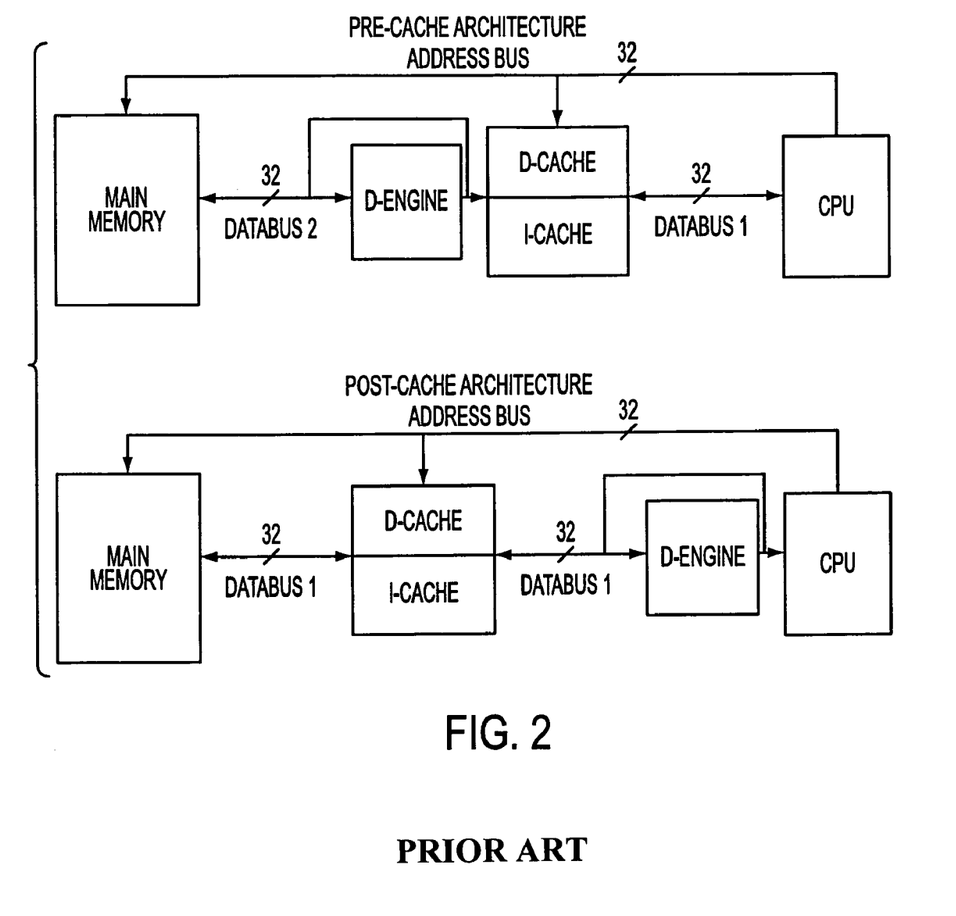
FIG. 2 shows pre-cache and post cache architecture for usage in code compression in a system with a multi-layered hierarchy.

In order to evaluate the advantages/disadvantages of what we call pre-cache and a post-cache architecture, we have conducted simulations before we started the implementation. Specifically, we measure in this section the toggles on the bus as a metric that relates effective bus bandwidth.

Figure 3A:
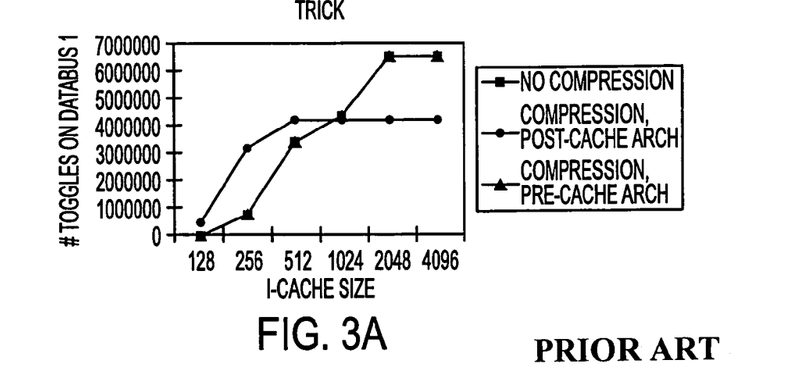
FIGS. 3A–3C shows toggles on DataBus 1; toggles on DataBus 2 and sum of toggles respectively.
Figure 3B:
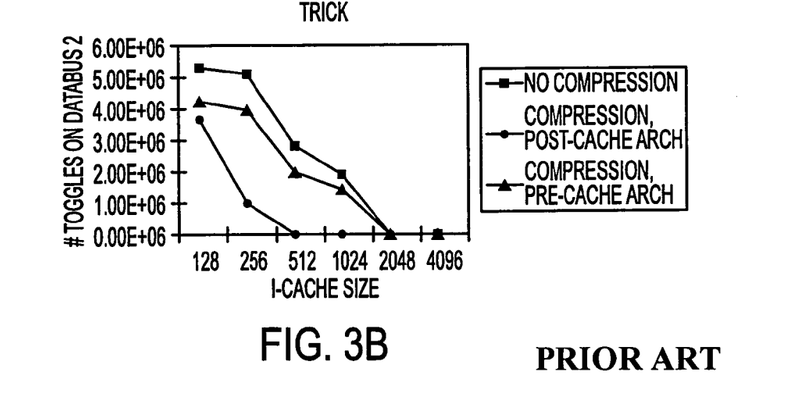
Figure 3C:
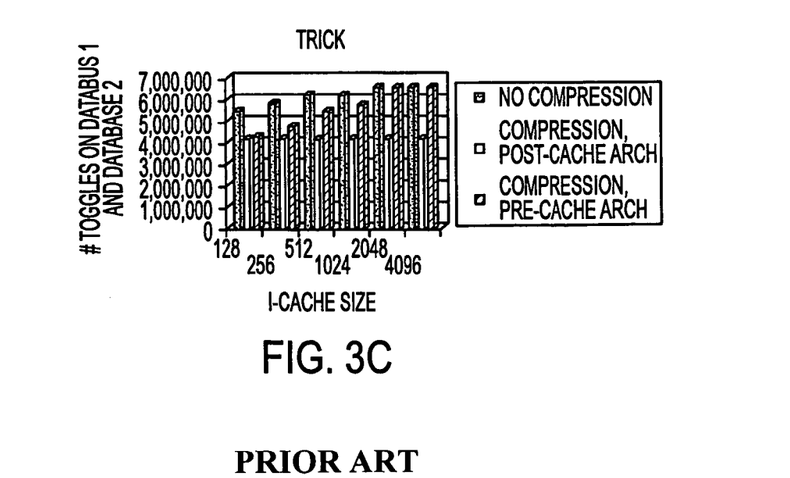

The architectures are shown in FIG. 2. In the pre-cache architecture the decompression engine is placed between main memory and the instruction cache. In the post-cache architecture the same engine is located between the instruction cache (in the following we will use the shorter term I-cache instead) and the processor. Obviously, in the architecture post-cache both data buses profit from the compressed instruction code since the instructions are only decompressed before they are fed into the CPU whereas in the pre-cache architecture only DataBus 2 profits from the compressed code. In order to discuss various effects we conducted diverse experiments from which we selected the application trick. We calculated the number of bit toggles when running the application on both target architectures. The number of bit toggles are related to the the effective bandwidth (and other metrics like power consumption, for example). The results are shown in FIG. 3 for trick. It consists of three partial figures: the top one shows the number of bit toggles for DataBus 1. We showon DataBus 1 only those bit toggles that refer to cache hits.

Thus we can see how the number of hit-related toggles on DataBus 1 increases as the number of toggles on DataBus 2 (misses) decreases. The toggles on DataBus 2 are shown in the mid figure whereas the charts in the bottom figure show the sum of both. The parameter on the x-axis of all figures we have used is the cache size (given in bytes).

FIG. 2. "Pre-cache" and "post-cache" architectures for usage in code compression in a system with a multi-layered memory hierarchy Each of those figures comprises three graphs: one shows the case where we have no instruction compression at all, one refers to the post-cache and the third to the pre-cache architecture. Starting with the top figure in FIG. 3, we can observe that the number of bit toggles increases with increasing cache size. All three architectures3 finally arrive at a point of saturation i.e. a point where the number of bit toggles does not increase any more since the number of cache hits became maximum. The two most interesting observations here are:

a) The "saturation point" is reached earlier in case of the post-cache architecture (i.e. 512 bytes) as opposed to 1024 bytes in case of the pre-cache architecture and no compression. In other words, we have effectively a larger cache. That actually means that we can afford to have a cache that is only half the size of the original cache without any loss of performance solely through locating the decompression engine where it is placed in the post-cache architecture. We can also decide to keep the same cache size. Then we can gain performance. If we do not need the increased performance then we can trade this performance increase against energy/power by slowing down the clock frequency, for example.

b) The number of toggle counts is the lowest for post-cache at a given I-cache size for reasonable sizes (a "reasonable" cache size is one where we have reached what we called the saturation point above; it provides a good compromise between cache size and number of cache misses). Thus, post-cache seems most energy efficient for DataBus 1.

The mid figure in FIG. 3 shows the number of toggles on DataBus 2. Via DataBus 2 all instructions are transferred that caused a cache miss before. Here we can observe:

a) The number of toggles is for all I-cache sizes smaller in case of post-cache architecture than in the pre- Please note that the architectures no compression and pre-cache are almost overlayed and are showing up as only one graph. This is because of the larger effective cache size (as discussed above) that causes less cache misses and hence a smaller traffic (this relates to bit toggles) through DataBus 2.

b) Whereas we had no advantage of pre-cache architecture on DataBus 1 against architecture no compression on the same data bus, we do have an advantage here at DataBus 2 since compressed instructions are transferred here.

Now, the question is how large the overall number of bit toggles related to instruction code is on buses DataBus 1 and DataBus 2. The bottom chart in FIG. 3 gives the answer. In all reasonable I-cache configurations, post-cache architecture gives the lowest amount of bit toggles while the pre-cache architecture is actually better or almost equal to no compression in all cases. Please note that 128 bytes I-cache size does not represent a "reasonable" size since it would offer a too low performance.

We note that some modern processors have a built-in L1 cache. However, our decompression engine can be placed between an L1 and L2 cache in such cases.

D. Obstacles in Code Compression

We present some important problems when designing a code compression scheme that works in either a post-cache architecture, or an architecture that does not incorporate a cache.

1. Inability to Deduce Program Flow from the Program Counter

There are cases where it is impossible to find out whether the CPU has executed a branch or not, due to pipeline effects. Consider the following case:

bnez a5, L1
sub a2,a3,a4
addi a3,a3,1
and a2,a2,a3
L1: or a1,a2,a3

By observing the program counter values coming from the CPU it is impossible to know whether the branch is taken or not because all instructions after the bnez instruction are requested anyway due to pipeline effects. An external decompression engine will not know whether these instructions are really executed or not. This is a problem because the decompression engine may take some action due to these instructions. If for example, a call instruction appears instead of the addi instruction, the decompression engine may insert its address in the call stack.

2. Branch/jump Instructions

Handling branches, jumps, calls etc. in code compression can be a major challenge. Unless the code compression scheme provides a complete mapping for any uncompressed address to its corresponding compressed address, it is necessary to provide a mechanism to detect potential branch targets. If we assume that all potential branch targets FIG. 3. Trick application. Top: toggles on DataBus 1. Mid: toggles on DataBus 2. Bottom: sum of toggles 10 are known in the program then it is possible to devise a scheme that only provides a mapping from uncompressed branch target addresses to their corresponding compressed addresses.

However, due to the existence of jump to register or call to register instruction found in many instruction sets, it is impossible to derive all targets from the executable alone. Often these jump to register instructions load their register values from a jump table, which can be located in the executable and used to retrieve the potential targets. In some cases though, the target address is the result of arithmetic operations happening in runtime making the detection of the potential targets very hard if not impossible. Our experience with executables has shown us that certain Clanguage contructs such as switch statements, generate such code. We have not been able to solve such cases even by closely trying to follow the program flow in the executable, let alone by writing software to accomplish this. We believe this is a problem that has been overlooked in previous work in code compression.

3. Code Alignment

The following problem is a general problem that occurs virtually with any instruction set architecture. It is about code placement in the compressed space and its alignment. First, the assumptions/circumstances under which this case occurs are encountered, then the problem and possible solutions are discussed. Note that if the unknown jump targets problem is solved, then it is possible to align all jump targets to word boundaries and solve this problem. If however, in the general case, any instruction is a potential target, the code placement problem make this constraint almost impossible to follow.

Assumptions:

a) a jump occurs b) Jump target in compressed space and jump target in uncompressed space point to different locations within a word. This is very likely since the CPC (program pointer in the compressed space) advances slower due to compression. It should be mentioned that due to other reasons (decoding etc.), in both cases, PC and CPC are aligned to byte boundaries.

c) the processor assumes to receive a full word any time when fetching takes place even when, for example, not all bytes of these full word are used to assemble the next valid instruction (note, that an instruction can be smaller than the word size).

The problem occurs because in compressed space the jump leads to an address representing a boundary such that decompression starting from this boundary will not deliver a full word without accessing the next word. In other words, in order to deliver a full word to the processor, the next word has to be accessed. This, however, requires another fetch. The problem is that another fetch needs at least one more cycle. Since the CPU cannot be stalled, other means have to be taken to prevent this case in the first place. Here is the condition for the case:

$$f(bs(jump\ target; n))\_word\ length \quad (1)$$

There, $f(y)$ is a function that returns the number of bits in uncompressed space of a compressed bit sequence of length y. $bs(a; b)$ is a bit sequence in compressed space starting at the $a\_th$: position and ending at the $b\_th$: position. jumptar-get_th: is the bit position where the jump points to in compressed space whereas n is the last bit in the compressed word where the jump targets to.

Note that this problem does not occur when an instruction, sequentially following another instruction and not being fetched due to a jump, in the compressed space spans two words. In that case, the compression history assures that a full word will be delivered, even though it might contain only part of an instruction. This case is not different from conventional execution and will typically be handled by the processor hardware.

II. SUMMARY

To solve some of the problems noted above, this disclosure teaches a method for code compression of a program, the method comprising separating code from data. Software transformations necessary to make address mappings between compressed and uncompressed space are introduced into the code. Statistics are obtained about frequency of occurrence instructions, wherein said statistics include frequency of occurrence of two consecutive instructions. The program is parsed to identify occurrence of instructions or instruction pairs. The identified instructions are replaced with an address to a compressed bus-word table. An address mapping is generated from uncompressed address to compressed addresses.

Techniques similar to above that are based on words as opposed to instructions are also part of the disclosed teachings.

Systems to implement the disclosed techniques are also part of this disclosure.

III. BRIEF DESCRIPTION OF THE DRAWINGS

The above objectives and advantages of the disclosed teachings will become more apparent by describing in detail preferred embodiment thereof with reference to the attached drawings in which.

IV. DETAILED DESCRIPTION

A. Synopsis

Possible solutions to the problems noted above are disclosed herein.

a) Preventing the case by software means i.e. making sure that this case can not occur. There are various difficulties involved: statically recognizing a jump target is not possible due to jump instructions where the jump target is calculated dynamically. In this sense any instruction boundary in compressed space is a potential jump target. If means like code motion are applied to prevent the above-discussed case, the overhead penalty taken is too high since code motion techniques will eventually lead to increased code size.

This method, however may be applied to all those cases where a jump target is known. All other cases, however, are assumed to be resolved during execution (via hardware).

b) The above method will work for jumps where the targets are known, and a hardware method is required to solve the problem for jumps with unknown targets. Another technique we have used is to try to locate such unknown targets through simulation of the application and through careful examination of the code.

Careful examination of the code can solve most of these cases; a problem case we found is the case of switch statements. In those cases simulation may reveal the targets.

Benefits of the Our Approach

The benefits and distinctions of our two solutions are described below. A detailed explanation for these differences and the resulting benefits are discussed in the following sections.

a) Decompression is done on-the-fly and close to the processor. As result, the whole system benefits from code compression since memory and bus bandwidth is increased.

b) The example platform, discussed herein, is application independent and our second solution is ISA (Instruction Set Architecture) independent.

This ensures its applicability across many application and systems without substantial modifications.

c) The decompression hardware interfaces to the CPU without intruding the internals of the CPU. The technology can thus be adapted to any CPU. That implies that to port our technology to another hardware platform all that is necessary is to modify the interface module between the processor and the decompression engine.

d) The discussed hardware/software platform is not fixed to a specific compression. Rather, it is possible to study various table-based schemes. We provide adequate memory space to accommodate various compressed formats.

This means that different compression schemes can be tested without any hardware modification. The compression schemes tested should be table look-up based (dictionary compression techniques).

e) The software flow is designed to be applied to a standard compilation flow without altering it. In particular, an already compiled code can be used as is and be prepared for code compression. This guarantees the application our technology to legacy code.

f) We solve the problem of unknown branch targets, thus our techniques do not pose any limitations on the software such as, restricting the use of jump to register instructions. This problem has not been addressed adequately in the literature. We provide a general solution that can be applied to any application.

g) Our software flow is capable of identifying the most critical regions for compression (working set) and focusing on those to maximize the performance benefit of compression.

B. Compression Architectures

We describe two different methods here. These methods are proposed as solutions to the obstacles explained in the previous section. We assumed that the instruction set does not have a fixed instruction length. However the CPU fetches a fixed amount of bits every cycle from memory, unless there is a CPU stall. Both techniques use the following basic definitions:

During execution the CPU will give addresses that point to the uncompressed space (unless it is a branch/call/jump target as we explain below). We call these addresses UCs. A UC has to be mapped to a compressed address so that we can access the right memory location. In these approaches presented subsequently we chose to map a UC to a certain memory block first and subsequently to a compressed memory address. This is achieved by using the Memory Block Table (MBT).

Converting a UC to its corresponding memory block is not enough; we need to know its location in the block, which can reside on any byte boundary. This is done through the Offset Table (OT).

We divide UCs into groups which we call UC blocks. These blocks are a series of consecutive UCs. Grouping UCs is done to make addressing address conversion tables easier.

1. Naive Approach

A simple solution to the mapping problem from uncompressed space to compressed space, would be to store a complete table that gives a compressed address for each uncompressed address (UC). Consider an application that compression takes 256K of space. For each uncompressed address in this space, assuming uncompressed addresses can point to any byte boundary (which is the case for the Xtensa processor) we need 18 bits to represent any address and we need a table of 218 such locations. Although a complete table will solve the mapping problem it should be clear that in most it is an unacceptable solution for code compression.

Such mappings have been used before; an example is the LAT (Line Address Table) proposed by Wolfe and Chanin <9>, which maps uncompressed cache block addresses to compressed cache block addresses. The LAT scheme manages to avoid taking up space (about 3.25% of the application for 32-bit cache lines) mainly because it only provides a mapping at cache block boundaries. Furthermore it uses a clever compression technique to further reduce its size. In our case since we do decompression in one cycle, we need to have a mapping of any uncompressed address to its corresponding compressed address. Therefore a LAT-based approach will not do in this case.

In the following we will see that by using ever some clever transformation techniques or mapping table compression techniques we can overcome the table space problem of an uncompressed to compressed address map.

2. Program Flow Method

In the following we will present our methods by first describing the software flow which refers to the generation of the compressed executable and the associated tables, and then by describing the hardware flow which refers to the hardware architecture that includes the decompression engine.

a) Software Flow

Figure 4:
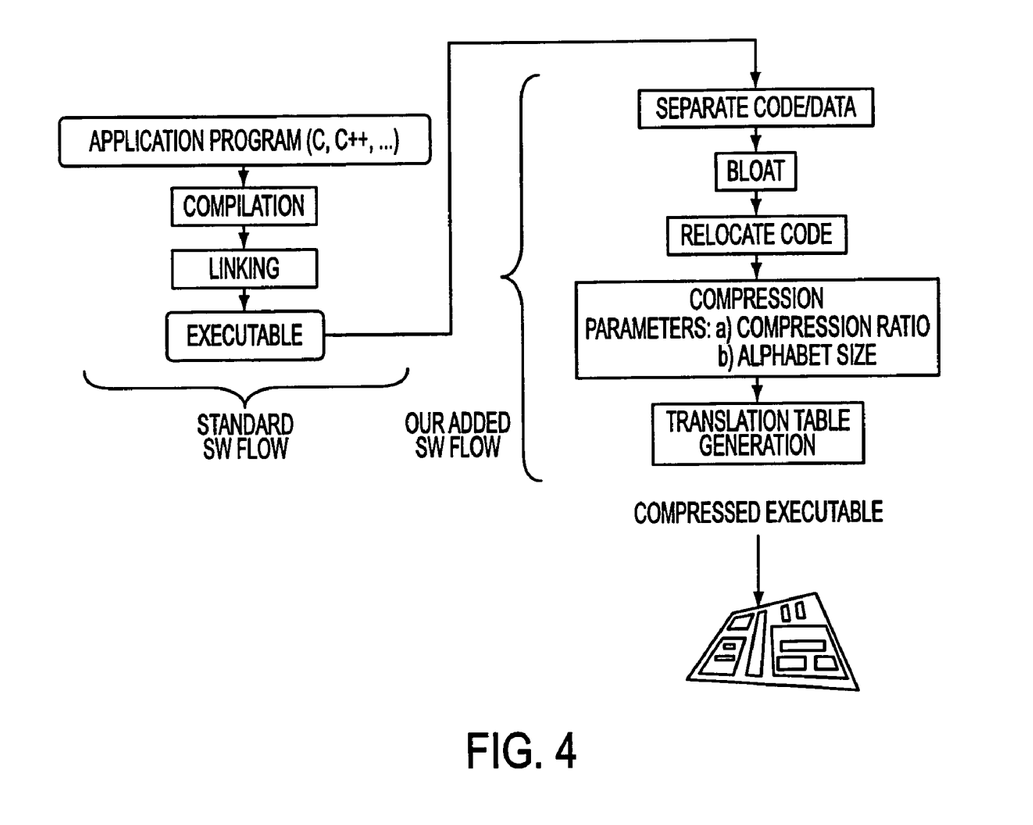
FIG. 4 shows an example flow of the software platform for supporting code compression according to an aspect of the disclosed teachings.

The program flow method is a novel approach to code compression algorithms in that it uses clever software transformation to avoid storing a full Offset table in the decompression engine. FIG. 4 shows the tool flow used to generate the compressed executable file and the address translation table from the original application. The compression software goes through the following steps:

1. Separating code from data phase During this phase, the executable is parsed and the data sections are identified and marked to avoid accidental compression of data.

2. Bloating phase During this phase, the software transformations necessary to make address mappings between uncompressed and compressed space work, are introduced in the code. These transformations are described in detail below.

3. Statistics gathering phase In this phase, statistics are collected, to obtain the frequency of appeareance of instructions in the program. The statistics include frequencies for two consecutive instructions, i.e. two 24-bit instructions that appear one after the other.

4. Compression phase This phase parses the program a second time and looks for occurences of instruction or instruction pairs that appear in the data structure of the previous phase. Whenever it finds one, it replaces it with an index to the compressed bus-word table. The possible compression ratios are from 24 to 16 bits, and from 48 to 16 bits (when compressing two consecutive instructions).

5. Translation tables phase This phase parses the original, and the compressed program simultaneously, and generates an address mapping from uncompressed addresses to compressed addresses.

The decompression engine contains an MBT table that maps any uc address to a compressed cache block in memory.

The exact byte position of that address in the cache block is what we call the offset which is derived from the software itself or in the case of jx and callx instructions (jumps and calls to register values) from main memory. The software transformations used to retrieve the offsets are as follows:

1. Sequential code Offsets are derived from decompression history. Decompression history is a mechanism used by the decompression engine to track compressed instruction sizes and thus compute the next compressed address in compressed space. While this works well for sequential code, it does not solve code with branches, calls etc.

2. Branches Where Targets are Known at Compile-time
OLD CODE: call target
NEW CODE: .byte xx
.byte xx # these bytes store the offset for the target
14
call target 3. Branches where targets are unknown at compile-time All jump instructions that have targets unknown in compile-time such as jx and callx need to be transformed as follows:
OLD CODE: jx a5
NEW CODE: neg a5,a5
132i a5,a5,0
jx a5

For calls:
OLD CODE: callx a5
NEW CODE: neg a5,a5
132i a5,a5,0
.byte xx
.byte xx # 2 bytes to signal the callx and
callx a5 # store the offset of the following instruction Regarding the above transformations, the main idea is to store the offset in the executable through the use of the .byte codes appearing above. These .bytes which do not correspond to any valid instruction, are detected by the decompression engine and are replaced by a NOP before sending them to the CPU. The case of unknown targets is slightly more complicated; the offsets are stored in main memory and are derived through a load instruction. Before the load we also insert a neg instruction which complements the jump register's value and make it an invalid target address. The decompression engine traps this invalid address (and thus knows there will be jx or callx instruction coming), adds an offset to it to make it go to a valid data address area and waits for the load result to appear on the bus. The valid data address is the address that stores the wanted offset. Once the decompression engine receives the offset it makes the data value equal to the original value of a5 such that a5 is loaded with its value before negation.

Then the jump can happen to the correct address, while the decompression engine known the offset.

Return instructions do not need special handling because we implemented a call stack used to store return addresses in the decompression engine. For all cases an array of offsets with their corresponding addresses is maintained in the CPU. This array is updated in a round robin fashion. When the array is full the first location is overwritten etc.

Every cycle the incoming uc is compared with all the ucs in these arrays and the corresponding offset is retrieved. If more than one uc match, the offset should be the same in both cases, and the result can be retrieved from any of the correct ucs.

Regarding the code alignment case discussed in the previous section, here we adopt the following strategy: for jumps, branches etc. that have known targets we ensure that the corresponding compressed target is aligned such that the CPU can always receive enough data (32 bits) to proceed with execution. In cases where we do not know the target address (example when the target of a jx instruction cannot be traced) our current solution locates those during runtime, through RTL simulation and then feeds this in the software generation software to generate the compressed executable. The generated executable takes into account alignment at the newly found targets, that are only known at run-time. While we recognize that there may some cases where simulation may not find all the potential targets, we found that for our benchmark programs it proved to be capable of solving most cases. In practice the only C code we found was not possible to find the targets before run-time was switch statements. Through simulation, and by forcing the switch to execute all its branches by changing the inputs it is possible to locate the targets in assembly code, and compress the executable. Thus far we are not aware of other possible C code that generates code where the targets cannot be traced in the executable.

b) Hardware Flow

Figure 5:
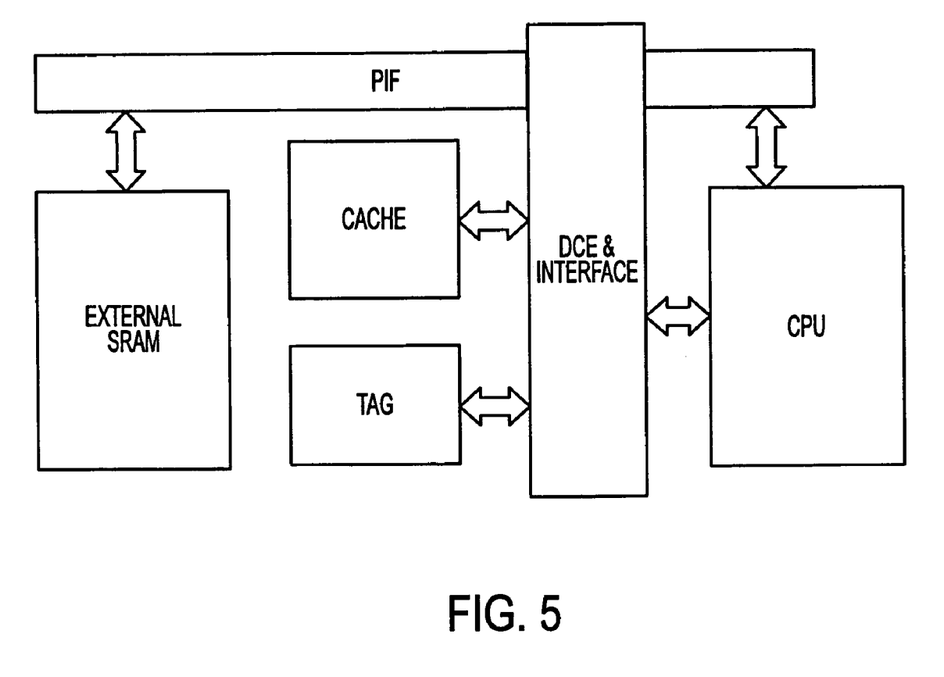
FIG. 5 shows an example block diagram of a system according to an aspect of the disclosed teachings.
Figure 6:
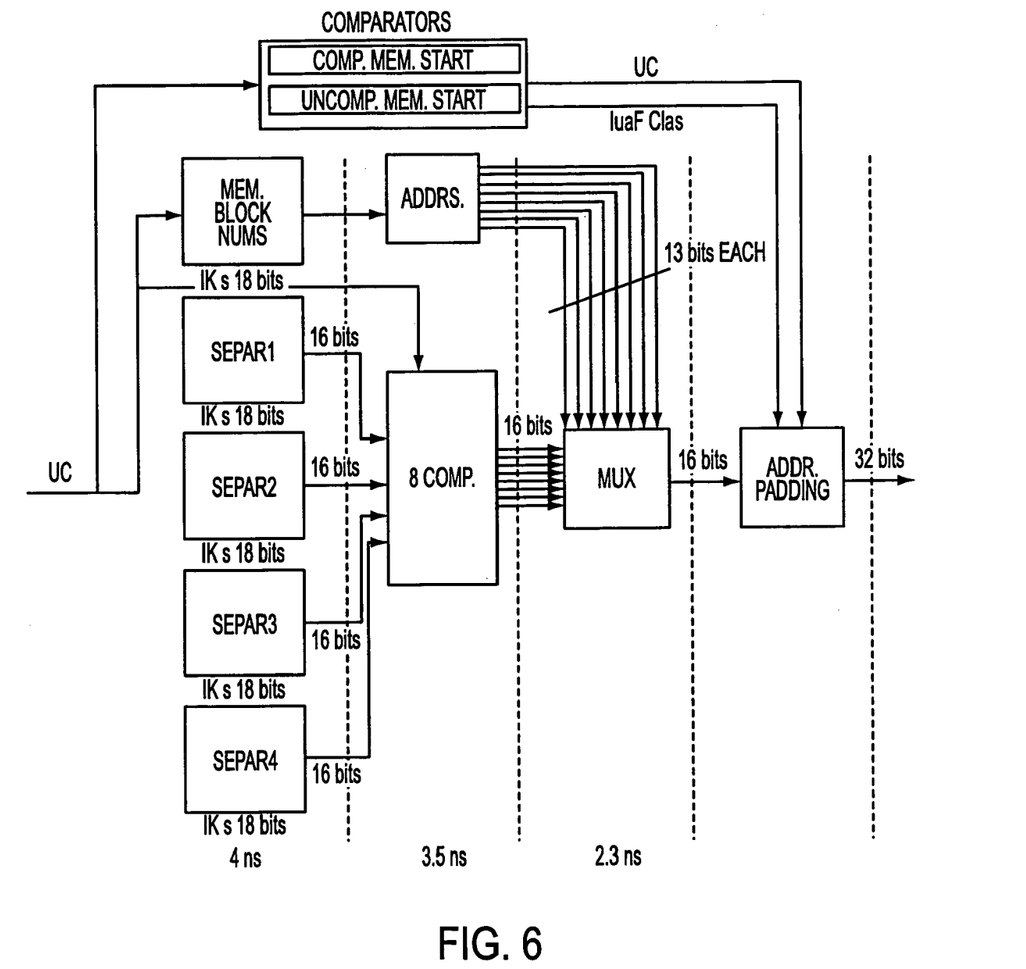
FIG. 6 shows an example of an address lookup block diagram.

FIG. 5 and FIG. 6 show the architecture, and UC address mapping block diagrams. FIG. 5 shows that signals coming from the PIF (Processor Interface), the Cache or the Tag, are intercepted by the DCE (Decompression Engine) and are modified such that the CPU is not aware of the existence of compressed code. We have designed our interface in such a way so that it can be separated from the decompression core, and so that it can be modified to work on a different platform.

We now describe the address mapping as shown in FIG. 6 in detail. Our implementation has the following constraints:

Extended Working Set (EWS): The platform is capable of handling applications of any size. However, the compressed region cannot be larger than 256 KB of continuous space. In this space some regions may be left uncompressed if compression is not desirable. The 256K space is what we call the Extended Working Set.

UC Block Size: Our UC blocks are 256 bytes long.

Cache block size The cache line we used is 32 bytes. However the architecture is flexible enough to handle other cache block sizes.

From the EWS and the Cache Block Size we can deduce that the memory block number requires 13 bits. We also deduce that we need 8 separators and thus if we have memories of 1K×18, we will need 4 memories each holding 2 separators. Since we have UC block sizes of 256 bytes we need 8 bits per separator. FIG. 6 illustrates the block diagram of the architecture. We also introduce two registers the compressed memory base (CMB), i.e. the start of the compressed code in compressed memory, and the uncompressed memory base (UMB), i.e. the start of the compressed code in uncompressed memory. The UMB is used to check whether the UC is within the compressed memory space and thus the address conversion should take place. The CMB is used to form the final address that will be combined with the 13-bit output of the address conversion logic. The comparators in the top of the figure carry out this function: they check whether the UC is in the UMB and if yes they will output the correct padding bits from CMB, otherwise they will just output the original UC value. The True/False line is used to signal to the address-padding unit whether the original UC should be used or the CMB bits must be padded with the output of the address conversion (a mux is needed).

The 13 bits coming from the table have to be padded with the appropriate bits depending on the location of compressed code in memory to form a full 32-bit address. Also the decompression history offset will be concatenated to the LSB part. Thus we need 15 bits to be padded on the MSB side and 5 bits to be padded on the LSB side to form a full 32-bit address for the cache/memory.

The main advantage of this approach is complete independence from the cache size on the architecture. A number of registers can be used to make the system as general as possible as follows:

A register holding the number of bits in the memory block table. The value is 12 in the above example A separator mask register, maximum supported is 28 bits of separator storage per table entry.

A register storing the number of separators in the separator table.

An implementation using the Xtensa processor, resulted in 90,000 gates on an FPGA board, running at 30 Mhz.

Preliminary experiments show that an improvement of 1.2× is possible.

3. Word-Based Compression

This is a solution that solves all the issues presented in the previous section at the expense of compression ratio, especially when the instruction sizes are not equal to the instruction bus width. The main idea here is to compress a whole bus word irrespective of the instructions that may consist this bus word. In our current implementation we compress two consecutive 32-bit words into one 32-bit word thus transmitting twice as much information on the bus whenever possible. Since we do not take into account instructions themselves, and since a 32-bit word may contain instructions aligned in any byte position, compression ratios are only modest; however the decompression hardware is greatly simplified. We explain this method by first focusing on the software side and subsequently on the hardware side.

a) Software Flow

The compression software goes through the following steps:

1. Separating code from data phase During this phase, the executable is parsed and the data sections are identified and marked to avoid accidental compression of data.

2. Statistics gathering phase In this phase, statistics are collected for the frequencies of appeareance of 32-bit words in the program. Instructions are not taken into account, only whole words which may consist of more than one instruction (at most two in the Xtensa ISA). The statistics include frequencies about doubles; i.e. 32-bit words that appear one after the other. Frequencies of doubles are used in the next phase for compression. All doubles are sorted according to frequency of occurence. The top 1024 are stored in a data structure which will be the compressed bus-word table.

3. Compression phase This phase parses the program a second time and looks for occurences of double that appear in the data structure of the previous phase. Whenever it finds one, it replaces it with an index to the compressed bus-word table (this is 32 bits wide, see below). We thus achieve a 64 to 32 bits compression whenever possible.

4. Mapping Tables phase This phase parses the original, and the compressed program simultaneously, and generates an address mapping from uncompressed addresses to compressed addresses.

Unlike the program flow method, word-based compression does not require any changes to the software before compression.

As a result it is much simpler and can work directly on the executable without interfering with compilation flow.

b) Hardware Flow

Figure 7:
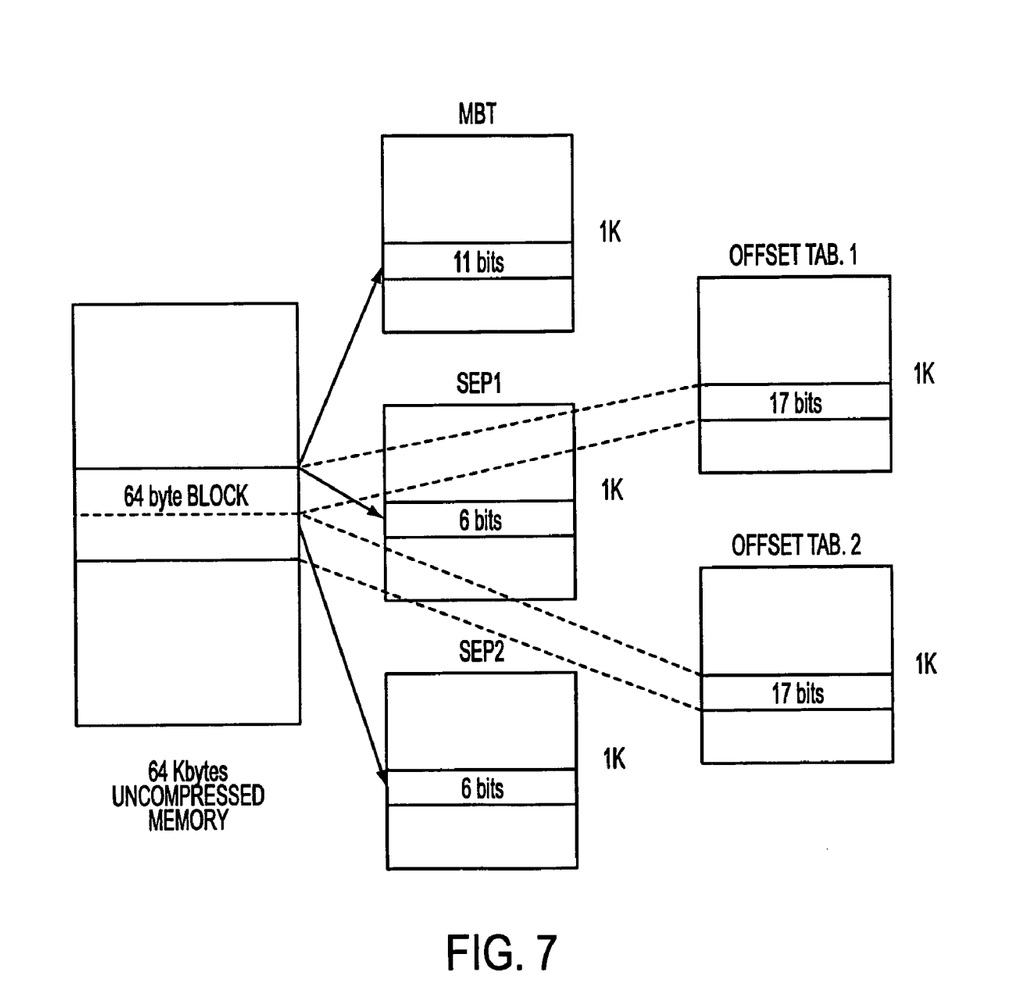
FIG. 7 shows conversion from uncompressed address to memory block number.

In this section we present the hardware implementation of the word-based compression method. Note that this method does contain a complete map from uncompressed addresses to compressed addresses as described in the naive method section; however, it uses compression techniques to slash the conversion table size. Futhermore, we have added an additional contraint in the EWS size, which is now limited to 64 KB. Regarding the conversion from the CPU's program counter (uc) to the cpc used to index words in the compressed space (mapping tables phase), we chose to store the full mapping between these two pointers in the decompression engine. This mapping consists of a memory block table that takes a uc and gives a compressed memory cache block address. The exact offset is taken from a structure called the offset tree. A detailed description of these mapping structures follows. The UC space is divided in 64-byte blocks. Each 64-byte block is mapped to a certain cache block which corresponds to the first UC address in the UC block. The rest of the addresses may belong to either this cache block or the next one or the one after the next one. In other words there are at most 3 possible cache blocks spanning one UC block. In the MBT table we only store the first of these possible cache blocks. The addresses of the next two, are derived two other tables which are called Separator Tables or SEPs. These SEPs store the offset from the starting address in the MBT to retrieve the two additional cache block addresses. Since we have at most two more cache blocks spanned by the 64-byte UC block we need two separators, each stored in a separate table. Using the MBT and the SEP tables we can retrieve the exact cache block where the current UC is located. FIG. 7 illustrates the conversion from UC to memory block number.

Figure 8:
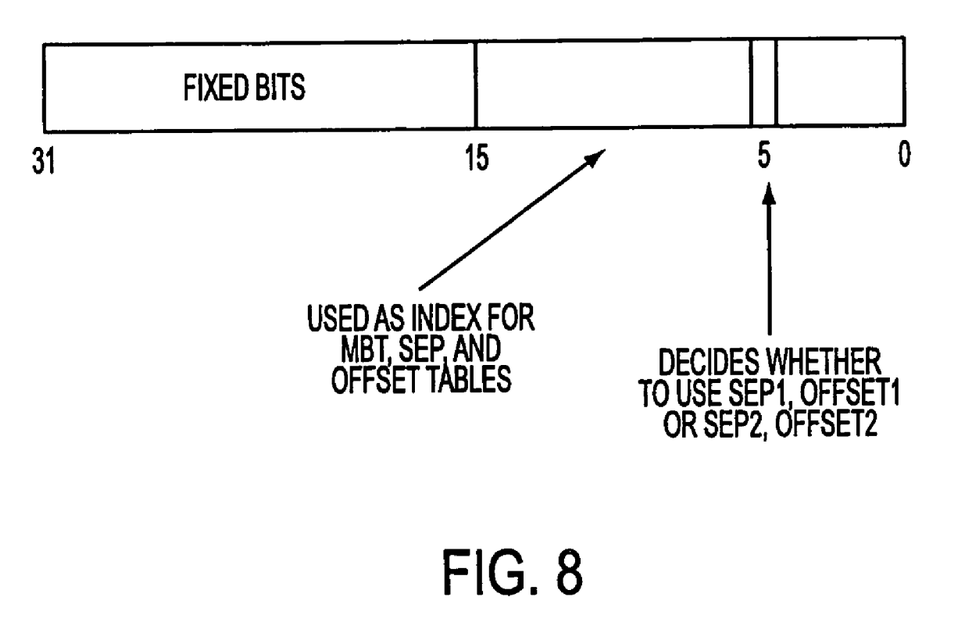
FIG. 8 illustrates indexing of the tables.

The exact byte position in the cache block is retrieved through the OFFSET tables, which are designed to be compact by using a structure called the offset tree. The offset tree is calculated from every 64-byte block. Every such block requires two 17 bit offset trees. FIG. 8 illustrates a tree structure. The main concept is that starting at the cache block beginning, since any word will either remain intact or will be combined with the next word to form an uncompressed/compressed 32-bit word, the possible locations for the UC addresses can be given from this tree.

Consider the UC address that corresponds to the first word in the compressed cache block. This can only start at the starting location of the compressed cache block hence the 0 to 0 line in the figure. The last number in each line of the figure shows how many bits are required to encode the ambiguity of the location for each UC. When trying to locate the position of the second UC word (see second line in the figure) that can be located either at location 2 (if there was compression in the first word), or at location 4 (if there was no compression in the first word). Thus we have two possible locations, and to encoded those we need 1 bit as shown in the second line of the tree. Continuing in the same fashion we build the tree shown in FIG. 8 and we get 17 bits total size to encode the location of all 8 UC words in the compressed cache block.

Note that this method solves the problem of code placement by providing a full mapping of UC to CPC addresses and by ensuring compression is happening at the bus word level and not the instruction level.

Figure 9:
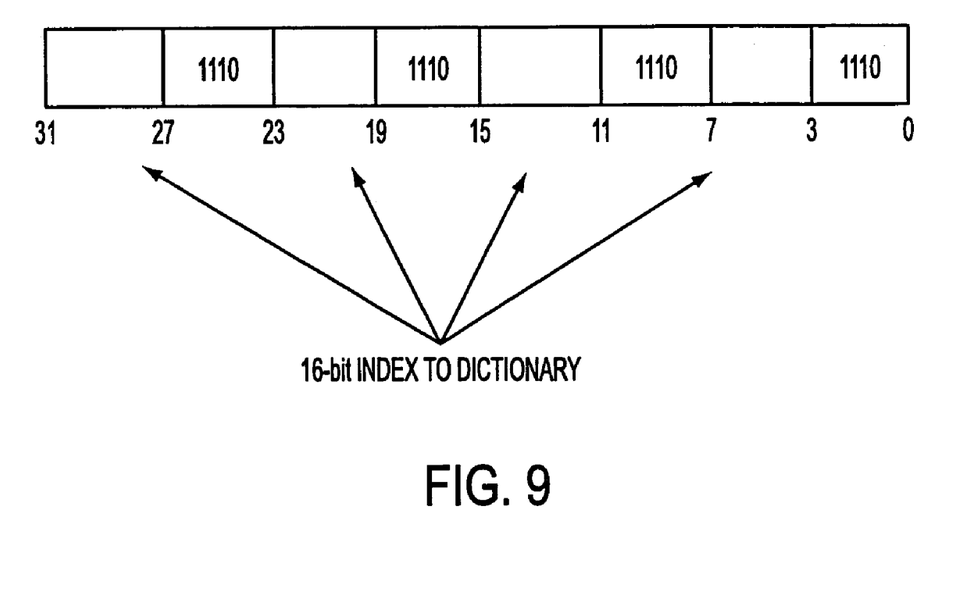
FIG. 9 shows an example compressed word structure.

The above structures are independent of instruction set design or architectural details, other than the basic assumption of a 32-bit instruction bus. For instruction encoding we performed experiments on the Xtensa processor which we will use subsequently to demonstrate our technique. FIG. 9 shows a compressed 32-bit word which originally consisted of two uncompressed 32-bit words. We take advantage of the fact that any Xtensa instruction will never use the bit combination 1110 for its 4 LSB bits. Since instructions can start on any byte boundary, we are forced to encode the compressed word by selecting to store 1110 on all bytes in the word as a flag that this is a compressed word. Note that we would not be able to avoid placing 1110 in all bytes because a regular Xtensa instruction might contain 1110 in any other location other than the 4 LSB bits. As shown in the figure, we still have 16 bits to use for indexing the compressed dictionary.

Our experiments show that word-based compression, can result in performance improvements of up to 1.4× compared to a system without compression. Performance improvement appears to vary depending on the application and the choice of cache size. Our decompression engine design currently takes 15,000 gates and runs at 33 MHz on an FPGA board.

C. CONCLUSION

The contributions of this disclosure include hardware/software platform that allows to rapidly prototype and evaluate diverse code compression technologies. We have identified two approaches fulfilling requirements of most of today's instruction set architectures for decompressing code in one cycle. They are a) Program Flow Method b) Word-based Compression/Decompression.

Which approach is beneficial depends on: a) the instruction set architecture b) the size of the processor in gates (as the implementation effort of the decompression architecture differs, it should not exceed the size of the processor in order to be area-efficient for an SOC c) the latency (critical path) of the processor design. It decides whether there is sufficient slack time to process decompression in one cycle d) the major goal in using code compression: reducing memory size, increasing performance etc. The disclosed hardware/software platform is furthermore flexible as it allows to study different parameters once a method has been chosen.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method for code compression of a program, the method comprising:

a) separating code from data;
b) introducing software transformations necessary to make address mappings between compressed and uncompressed space into the code;
c) obtaining statistics about frequency of occurrence of instructions, wherein said statistics include frequency of occurrence of two consecutive instructions;
d) parsing the program to identify occurrence of instructions or instruction pairs that appear in step c;
e) replacing the identified instructions in step d with an address to a compressed bus-word table;
f) generating an address mapping from uncompressed address to compressed addresses; wherein step b comprises loading offsets in memory and deriving the offsets using a load instruction; wherein prior to loading, a neg instruction is inserted that complements with a jump, register's value to make an invalid target address; and wherein during decompression, a decompression engine creates a valid address from the invalid target address using an offset.

2. The method of claim 1, wherein in step a sections of the code that contain data are marked.

3. The method of claim 2, wherein the data is not compressed.

4. The method of claim 1, wherein in step b comprises computing offsets for addresses, said offsets being used for computing a next compressed address in a compressed space.

5. The method of claim 1, wherein step b comprises replacing a branch with a reference to a target address that is known at compile-time.

6. A method for code compression of a program, the method comprising:

a) separating code from data;
b) introducing software transformations necessary to make address mappings between compressed and uncompressed space into the code;
c) obtaining statistics about frequency of occurrence of words, wherein said statistics include frequency of occurrence of two consecutive words;
d) parsing the program to identify occurrence of words or word pairs that appear in step c;
e) replacing the identified words or word pairs in step d with an address to a compressed bus-word table;
f) generating an address mapping from uncompressed address to compressed addresses; wherein step b comprises loading offsets in memory and deriving the offsets using a load instruction; wherein prior to loading, a neg instruction is inserted that complements with a jump, register's value to make an invalid target address; and wherein during decompression, a decompression engine creates a valid address from the invalid target address using an offset.

7. The method of claim 6, wherein in step a sections of the code that contain data are marked.

8. The method of claim 7, wherein the data is not compressed.

9. The method of claim 6, wherein in step b comprises computing offsets for addresses, said offsets being used for computing a next compressed address in a compressed space.

10. The method of claim 6, wherein step b comprises replacing a branch with a reference to a target address that is known at compile-time.

11. A system for code compression of a program, the system comprising:

a processor interface;

a cache;
a tag;
an external SRAM; and
a decompression engine,
wherein the system is operable to decompress a portion of a code of the program, the portion having at least one instruction branching to an uncompressed address and retrieve a compressed block address from a mapping table of uncompressed addresses to compressed blocks,
the system being further operable to retrieve an address offset from offset information encoded in the portion of the code, the offset information being encoded in the code during generation of the program;
the system being further operable to use the compressed block address and the address offset to retrieve a next portion of compressed code in the program; the system being further operable to load address offsets in memory and deriving the address offsets using a load instruction; wherein prior to loading, a neg instruction is inserted that complements with a jump, register's value to make an invalid target address; and wherein during decompression, the decompression engine creates a valid address from the invalid target address using an offset.

12. A method of code compression of a program, the method comprising:
    decompressing a portion of code in the program, the portion comprising at least one instruction branching to an uncompressed address;
    retrieving a compressed block address from a mapping table of uncompressed addresses to compressed blocks;
    retrieving an address offset from offset information encoded in the portion, the offset information encoded in the code during generation of the program;
    using the compressed block address and the address offset to retrieve a next portion of compressed code in the program; wherein loading address offsets in memory and deriving the address offsets using a load instruction; wherein prior to loading, a neg instruction is inserted that complements with a jump, register's value to make an invalid target address; and wherein during decompression, a decompression engine creates a valid address from the invalid target address using an offset.

13. The method of claim 12 wherein the offset information comprises an encoding of the offset address when a branching target of the instruction is known at compile-time.

14. The method of claim 12 wherein the offset information comprises a load instruction which loads the offset address from memory during execution of the program where a branching target is not known at compile-time.

15. The method of claim 12 wherein at least some of the offset information is removed prior to execution of the decompressed portion of code in the program.

* * * * *